UNITED STATES PATENT OFFICE.

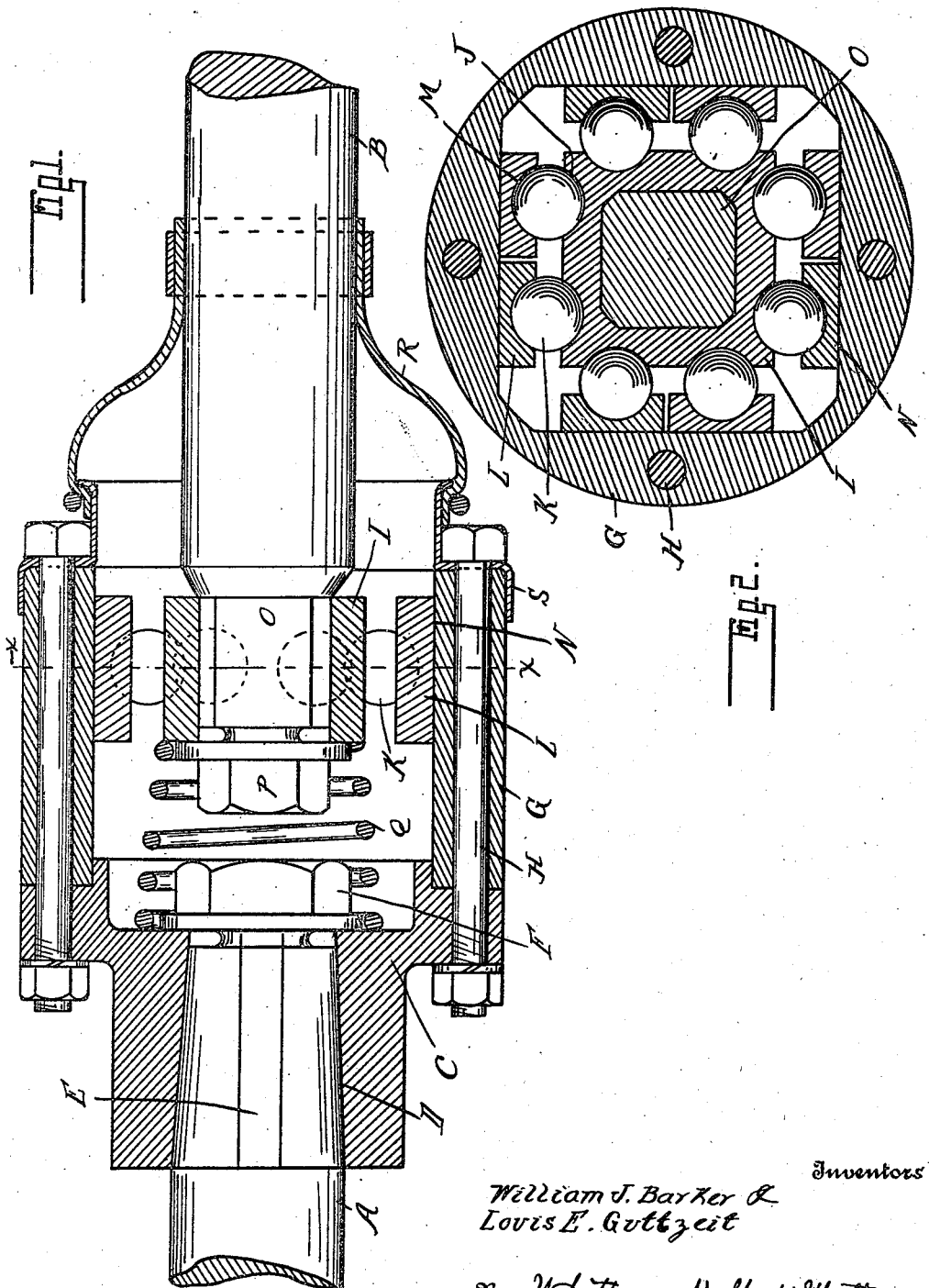

WILLIAM J. BARKER AND LOUIS E. GUTTZEIT, OF PONTIAC, MICHIGAN.

UNIVERSAL JOINT.

1,188,606.

Specification of Letters Patent.  Patented June 27, 1916.

Application filed May 29, 1915. Serial No. 31,127.

*To all whom it may concern:*

Be it known that we, WILLIAM J. BARKER and LOUIS E. GUTTZEIT, both citizens of the United States of America, residing at Pontiac, in the county of Oakland and State of Michigan, have invented certain new and useful Improvements in Universal Joints, of which the following is a specification, reference being had therein to the accompanying drawings.

The invention relates to universal joints designed for the transmission of torque, and it is the object of the invention to obtain a simple and inexpensive construction to manufacture, which is easily assembled, and which is free from many of the defects of constructions heretofore used.

In the drawings: Figure 1 is a longitudinal section through the joint; and Fig. 2 is a cross section on line x—x Fig. 1.

A and B are respectively the drive and driven shafts in alinement with each other.

C is a head secured to one of the shafts, preferably the drive shaft A, by suitable means such as the tapered socket D fitting a tapered portion of the shaft, and held from rotation by the key E.

F is a nut engaging a threaded end of the shaft for directing the latter into the tapered socket.

G is a hollow head having a polygonal inner surface, and secured to the head C by suitable means such as the bolts H.

It is one of the objects of the invention to obtain a construction in which balls may be employed for transmitting the torque from the drive to the driven shafts. To this end the driven shaft B has mounted thereon a polygonal member I similar to the polygonal hollow head G, and provided with a plurality of sockets J in which balls K are placed. There are also provided a series of members L having sockets M for engaging the opposite sides of the balls K, and flat surfaces N for engaging the adjacent face of the polygonal socket member G. The member I is secured to the shaft B, preferably by engaging the polygonal portion O thereof, being clamped by a nut P engaging a threaded end of the shaft. There is also preferably placed a spring Q between the end of the shaft B and the head C for yieldably pressing the shaft B outward.

The construction as just described is one, the members of which are inexpensive to manufacture, and in assembling all that is necessary is to place the balls in the sockets of the member I, then place the members L in engagement therewith and longitudinally engage them with the polygonal socket member G. It will be noted that the balls K are arranged upon opposite sides of the radius which is perpendicular to the surfaces of the polygonal members I and G, and consequently they will transmit the torque in either direction of rotation by compression stresses passing therethrough. At the same time the drive and driven shafts are free to move universally in angular relation to each other, as the members L may slide upon the adjacent faces of the polygonal member G, and the members I and L can vary their angular relation by movement of the balls K in the sockets J and M. The members I and L, as well as the balls, are hardened, and the spherical sockets J and M are preferably made of slightly greater radius than that of the balls, so as to leave clearance for the feeding in of lubricant, and also to permit the temporary deformation of the balls under compression stresses. As the friction of the opposite sockets on the ball will seldom be in exact balance, the balls will be progressively rotated, so that the wear will be distributed uniformly over the surfaces thereof and will be but a slight factor. If at any time the wear on the balls becomes excessive new ones may be inserted at small expense.

The interior of the socket member G is packed with suitable lubricant, which is retained and is protected from dust and dirt by a suitable flexible boot R. This may be secured to a collar S clamped upon the member G by the bolts H, while its opposite end is suitably secured to the shaft B.

While we have described the specific construction of balls for transmitting the torque from the drive to the driven member, it is obvious that the essential feature is the automatic adjustability of these members, which might be obtained from forms other than true spheres.

What we claim as our invention is:—

1. A universal joint, comprising drive and driven shafts, a polygonal socket member on one of said shafts, a similar polygonal head upon the opposite shaft within said socket member, and balls intermediate said polygonal head and polygonal socket member offset from the radius perpendicular to the opposed faces of the polygonal head and the socket member to transmit the torque by compression therethrough.

2. In a universal joint, the combination with drive and driven shafts, of a polygonal socket member secured to one of said shafts, a polygonal head upon the opposite shaft within said socket member and provided with spherical recesses at opposite sides of the radius perpendicular to a face of the polygonal head, members each having a corresponding spherical recess and a flat face slidably engaging the corresponding face of said socket member, and balls intermediate said polygonal head and said members in contact with the face of the socket member, said balls engaging said spherical recesses.

3. In a universal joint, the combination with drive and driven shafts, of a polygonal socket member secured to one of said shafts, a polygonal head within said socket member secured to the other shaft and having its several faces in parallelism with the faces of the socket member, spherical recesses in the faces of said polygonal head, members having corresponding spherical recesses and flat faces slidably engaging the faces of said polygonal socket member, and balls engaging said spherical recesses intermediate said polygonal head and said slidable members, adapted to transmit torque from one to the other.

4. In a universal joint, the combination with a drive shaft and a driven shaft, of a polygonal socket member secured to one of said shafts, a polygonal head within said socket member having parallel polygonal faces and secured to the opposite shaft, balls engaging spherical recesses in said polygonal head, members having corresponding spherical recesses engaging the opposite sides of said balls and provided with flat faces which are slidably engageable with the faces of said polygonal socket, the assembled balls and slidable members being longitudinally insertible into said polygonal socket.

5. In a universal joint, the combination with a drive shaft and a driven shaft, of a polygonal socket member secured to one of said shafts, a polygonal head having parallel faces within and spaced from said socket member and secured to the other shaft, said head having spherical recesses in the faces thereof and upon opposite sides of each radius perpendicular to said faces, members having corresponding spherical recesses and opposite flat faces, and balls intermediate said members having spherical recesses and opposite flat faces and said polygonal head, engaging said spherical recesses and spacing said members from the head to be slidably engageable with the corresponding faces of said polygonal socket member.

6. In a universal joint, the combination of a drive and a driven shaft, a polygonal socket member secured to one of said shafts, a polygonal head secured to the other shaft arranged within said socket member with its faces parallel to and spaced from the corresponding faces of the latter, said head being provided with spherical recesses on opposite sides of each radius perpendicular to the polygonal faces thereof, balls engaging said spherical recesses, and members having corresponding spherical recesses engaging the opposite sides of said balls, being spaced thereby from said polygonal head, and having flat faces longitudinally and slidably engageable with the corresponding faces of said polygonal socket member.

In testimony whereof we affix our signatures in presence of two witnesses.

WILLIAM J. BARKER.
LOUIS E. GUTTZEIT.

Witnesses:
   Coe C. Tillson,
   Bessie Gilloe.